United States Patent Office 2,713,296
Patented July 19, 1955

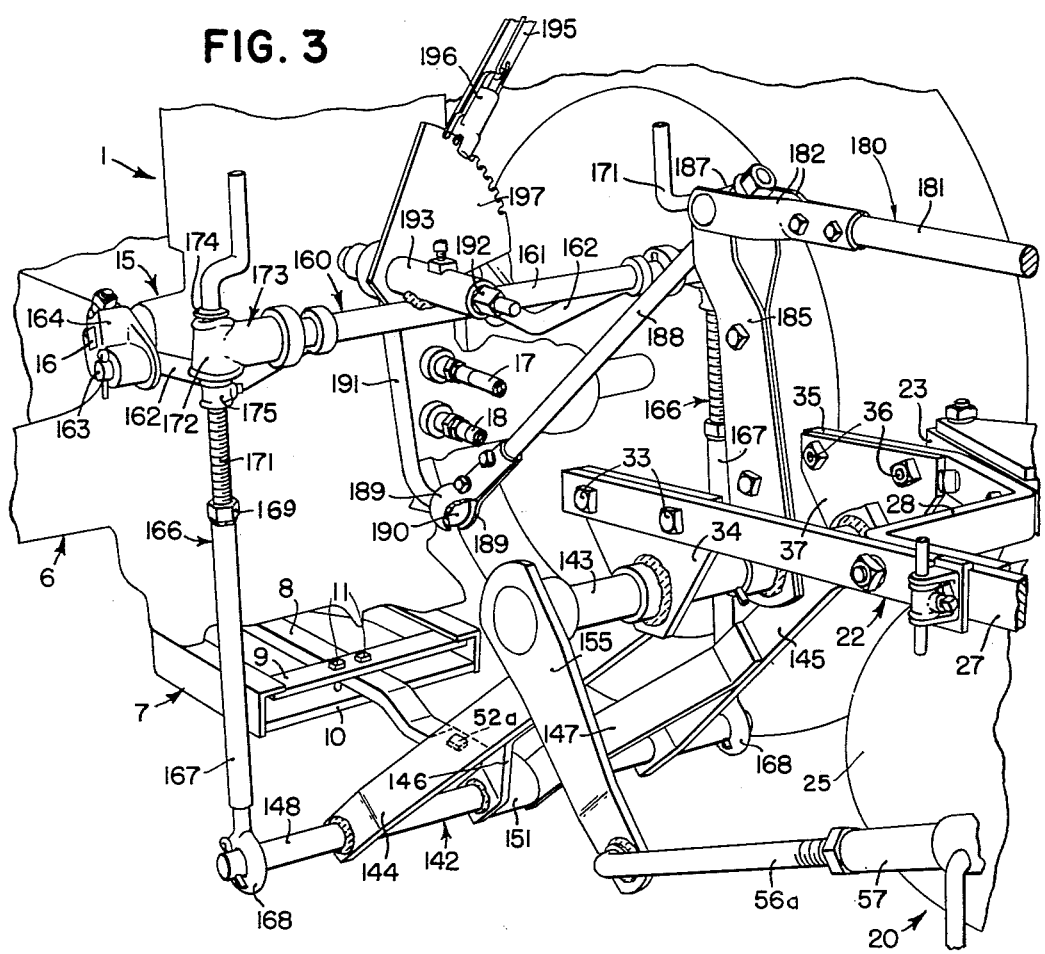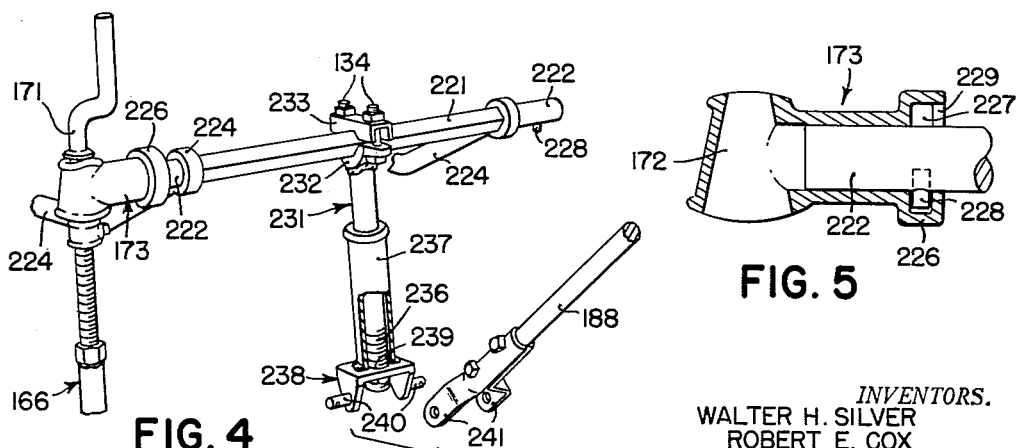
FIG. 3
FIG. 4
FIG. 5
INVENTORS.
WALTER H. SILVER
ROBERT E. COX
ATTORNEYS

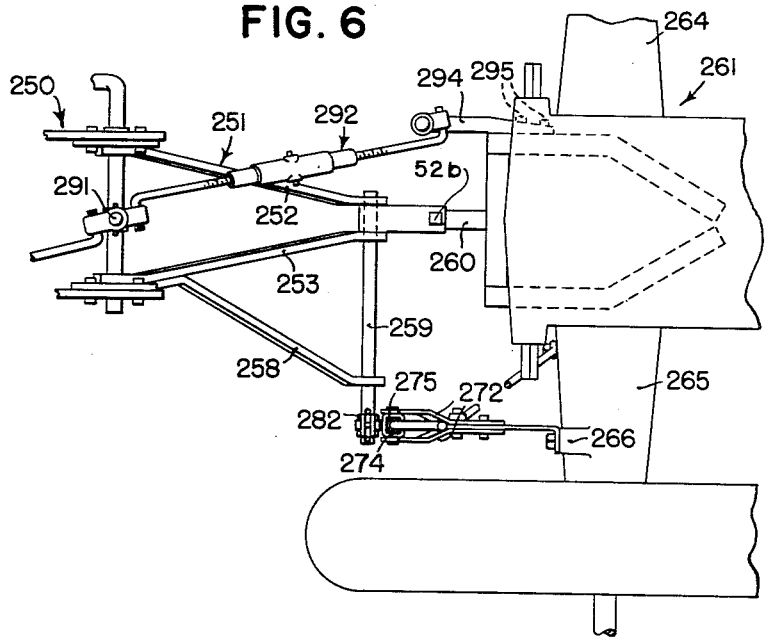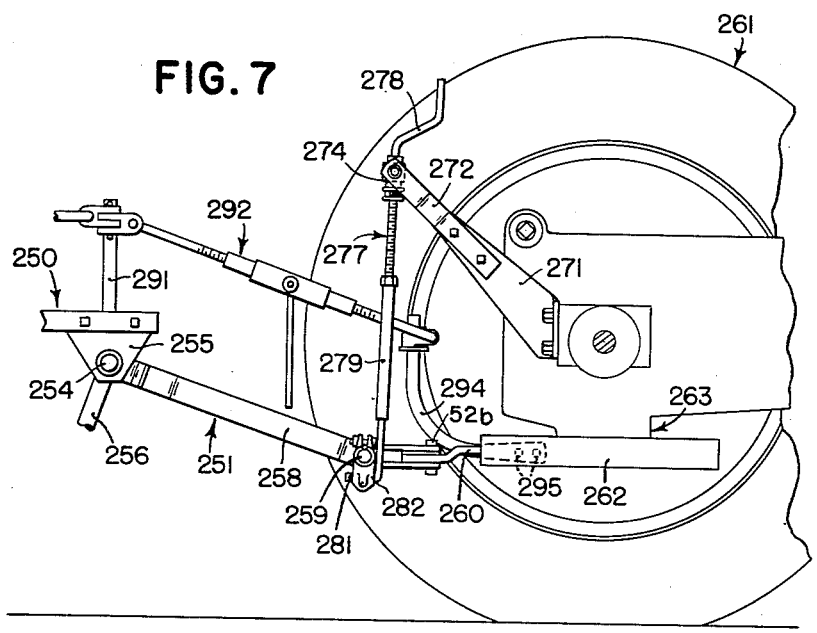

2,713,296
SEMI-INTEGRAL DISK PLOW

Walter H. Silver and Robert E. Cox, Moline, Ill., assignors to Deere & Company, Moline, Ill., a corporation of Illinois Application November 10, 1949, Serial No. 126,553

21 Claims. (Cl. 97—47.1)

The present invention relates generally to tractor-mounted implements and is more particularly concerned with ground-working tools such as plows and the like.

The object and general nature of the present invention is the provision of a semi-integral implement supported at its forward end on a tractor and at its rear end on a ground-engaging support in the form of a steerable rear wheel, with connections between the latter and the tractor so that when the implement is raised into its transport position the rear wheel may be steered in response to turning of the tractor relative to the implement but that when the implement is being backed, or when in working position, the rear wheel may be held against steering movement relative to the implement frame.

Another important feature of the present invention is the provision of a semi-integral implement having means whereby the front end of the implement may be raised and lowered relative to the tractor and in which said means also serves as at least a part of the means for leveling the implement, or controlling its position about a generally longitudinal axis, relative to the tractor, and still further, another feature of the present invention is the provision of means mounted on the leveling structure, or at least a part thereof, for steering the implement rear wheel in response to turning of the tractor relative to the implement.

These and other objects and advantages of the present invention will be apparent to those skilled in the art after a consideration of the following detailed description, taken in conjunction with the accompanying drawings, showing the preferred structure in which the principles of the present invention may be incorporated.

In the drawings:

Figures 3 and 4 are fragmentary perspective views, showing modified forms of the hitch and stabilizing connections between the front end of the implement and the tractor.

Figure 5 is a detail sectional view of certain parts of the stabilizing or leveling mechanism shown in Figures 3 and 4.

Figures 6 and 7 are fragmentary plan and side views, respectively, of a modified form of leveling mechanism providing means whereby the disk plow of the present invention may be attached to various makes of tractors.

Figure 1:
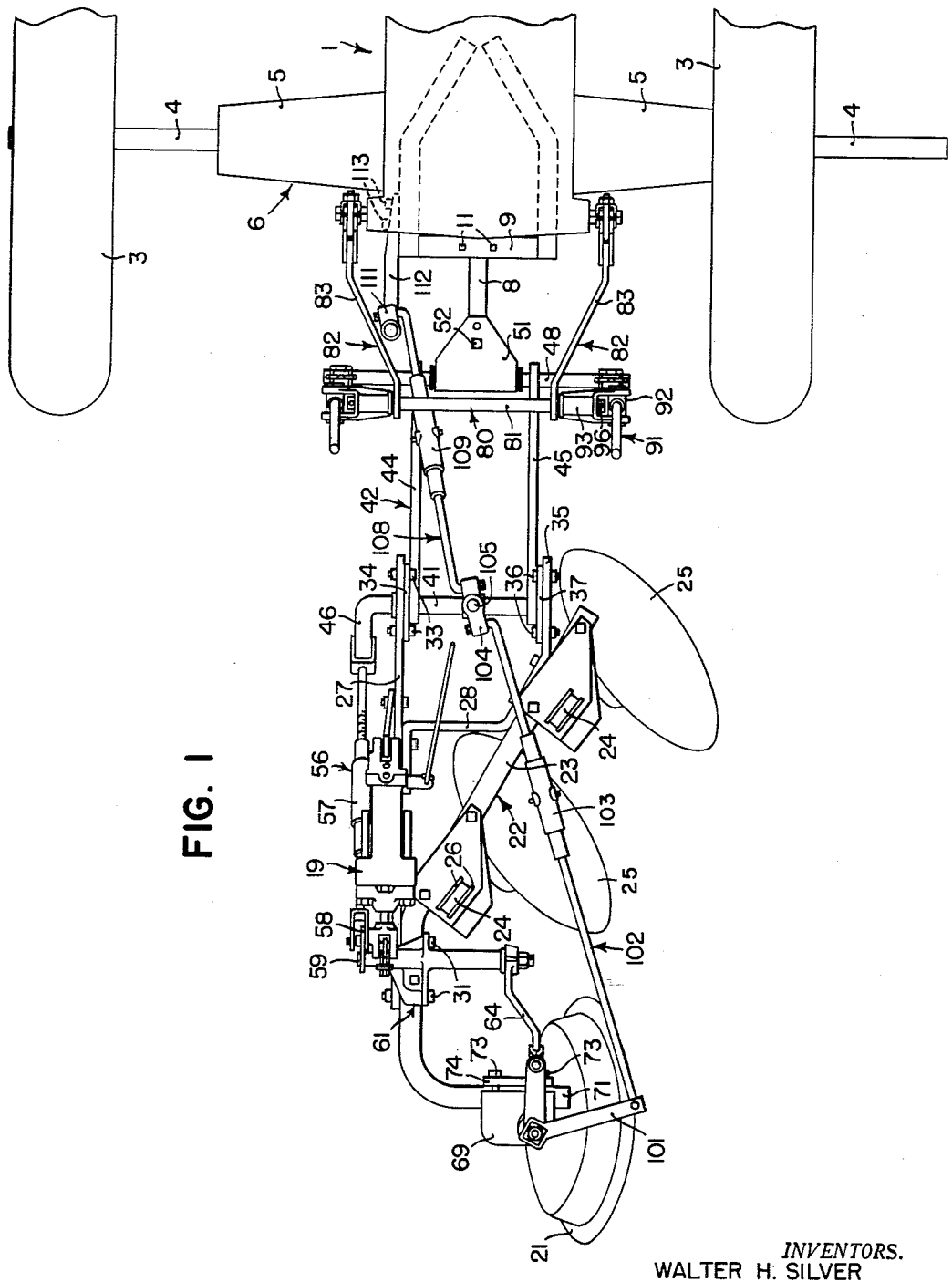
Figures 1 and 2 are plan and side views, respectively, of a tractor disk plow in which the principles of the present invention are incorporated.

Referring now more particularly to Figures 1 et seq., the tractor to which the implement of the present invention is connected is indicated in its entirety by the reference numeral 1 and includes rear drive wheels 3 mounted on axle shafts 4 that are carried in wheels or rear axle extensions 5 forming a part of the rear axle structure 6 of the tractor. Secured to the lower portion of the rear axle 6 is a frame forming a drawbar support 7 in which a normally laterally swingable drawbar 8 is mounted. However, the frame 7 includes upper and lower transverse bars 9 and 10 between which the drawbar 8 extends, and the bars 9 and 10 are apertured to receive a pair of bolts, pins or the like, indicated by the reference numeral 11, which when in place serve to fix the drawbar 8 to the drawbar support 7 and hold the same against lateral swinging.

The tractor 1 includes power lift mechanism indicated in its entirety by the reference numeral 15. The present invention is not particularly concerned with the details per se of the power lift mechanism, and therefore it will be sufficient to point out that the power lift mechanism 15 includes a transverse rockshaft 16 which may be operated to raise and lower implements or, optionally, may be freed for limited rocking movement, and the operating energy of the power lift mechanism controllably directed through two hose lines 17 and 18 to a double-acting hydraulic ram unit 19, which is the arrangement of the power lift mechanism when the implement of the present invention is attached to the tractor.

The implement in which the principles of the present invention have been incorporated and shown in the accompanying drawings by way of illustration is indicated in its entirety by the reference numeral 20 and comprises a semi-integral disk plow having its front end supported on the tractor and its rear end carried on a ground-engaging support in the form of a ground wheel 21. The implement 20 comprises a main frame 22 which is made up of a diagonally extending frame bar 23, to which a plurality of vertical disk standards 24, carrying plow disks 25, are connected by any suitable means, such as standard-receiving brackets 26, and a forwardly extending frame bar 27 which is connected to the forward portion of the diagonal frame bar 23 by a cross brace 28. The rear end of the auxiliary frame bar 27 is connected to the rearward portion of the diagonal frame bar 23 by a pair of bolts 31.

The forward end of the frame bar 27 is apertured to receive a pair of bolts 33 by which a bearing bracket 34 is fixed to the frame bar 27, and the right portion of the brace member 28 is extended, as at 35, and is apertured to receive a pair of bolts 36 by which a right-hand bearing bracket 37 is fixed in place so as to serve as a part of the plow frame 22. A transverse shaft 41 is mounted for rocking movement in the bearing brackets 34 and 37 and forms a part of a draft member which is indicated in its entirety by the reference numeral 42. The latter member which is swingably connected to the front end of the implement frame 22 for movement relative thereto about a transverse axis by virtue of the rockshaft 41, also includes bars 44 and 45 which extend downwardly and forwardly from the transverse shaft 41. The left end of the transverse rockshaft 41 extends downwardly and rearwardly, as indicated at 46, to form a crank, and the forward ends of the bars 44 and 45 are apertured to receive a forward crossbar 48 which preferably is rigidly secured, as by welding, to the bars 44 and 45 and the ends of the crossbar 48 extend laterally outwardly beyond the outermost bars 44 and 45 of the draft member 42 to receive stabilizing or leveling means to which reference will be made later. A hitch yoke 51 is disposed about the central portion of the crossbar 48, between the forward ends of the draft frame bars 44 and 45, and is pivotally connected, as by a hitch pin 52, to the rear end of the tractor drawbar 8 for both lateral and vertical swinging relative thereto. The connection afforded by the hitch yoke 51 is sufficiently loose to allow a certain amount of lateral tilting on the draw bar 8 relative to the tractor about a generally longitudinal axis.

The crank 46 is connected by a linkage 56, which includes an adjustable section 57, to an arm 58 that is fixed to a rear rockshaft 59. The latter is supported at its left end on a bearing bracket 61 that is fixed to the rear end of the diagonal beam 23. An arm 64 is fixed to the right end of the rockshaft 59 and is connected by a link 65 to a bracket arm 66 which is rockably connected with the upper end of the spindle portion 67 of an axle member 68 on the lower end of which the rear wheel 21 of the plow is journaled. The spindle section 67 extends upwardly through a combined casting and weight member 69 that is fixed to the rear inturned end portion 71 of the diagonal frame bar 23. Preferably, the member 69 is tapped to receive a plurality of cap screws 73 which serve as means clamping an attaching plate 74 to the front side of the laterally turned beam portion 71. Thus, when the rear rockshaft 59 is rocked to raise and lower the rear end of the frame relative to the spindle 67, the draft member 42 is swung about the transverse axis relative to the frame 22 as defined by the rockshaft 41. Since the forward portion of the draft member 42 is carried on the tractor drawbar 8, this rocking movement of the draft member 42 serves to raise and lower the front end of the frame 22 concomitantly with the raising and lowering of the rear end relative to the rear wheel 21.

Since the rear end of the implement is supported on the single rear wheel 21 and the front end at a single point on the tractor drawbar 8, some means for leveling or stabilizing the implement frame and holding the same against lateral tilting about a generally longitudinal axis is desirable. According to the principles of the present invention, we provide a stabilizing member in the form of a rigid bail 80 and pivotally mount the same on the rear end of the tractor. Preferably, the bail member 80 comprises a transverse bar 81 having forwardly extending arms 82 rigidly fixed to the end portions of the bar 81. Each of the arms 82 includes a laterally outwardly directed section 83 which is securely connected with a clamp member 84 adapted to be fixed to the rockshaft 16 of the tractor. A pair of individually adjustable links 86 are connected between the outermost end portions of the drawbar cross member 48 and the end portions of the bail 80. Each of the links 86 comprises a lower sleeve section 87 having an end 88 turned forwardly and pivoted in a swivel member 89 swingably mounted on the associated end of the crossbar 48. The upper portion of the sleeve section 87 is provided with a nut section 90 tapped to receive the threaded portion of an upper crank screw section 91 which is rotatably disposed in a trunnion member 92 which is rockably carried by the arms of a yoke member 93 which is swiveled on the associated outwardly extending end portion of the bail bar 81. An abutment 94 on the crank screw member 91 engages the upper portion of the trunnion member 92 and a set screw collar 95 is mounted on each crank screw section 91 below the trunnion member 92. Each of the yokes 93 is held against displacement by the rear end of the associated arm 82 and a pin 96 in the end of the bar 81. Thus, by turning one or the other of the crank screws 91, the front end of the implement may be tilted laterally relative to the tractor about a generally longitudinal axis, and the bail 80 being a rigid member holds the front end of the implement frame in position relative to the tractor so far as any lateral tilting is concerned. When the tractor turns relative to the plow, the links 86 are swung fore and aft a small amount, but this is accommodated by limited vertical swinging of the bail member 80 by virtue of the permissible rocking movement of the rockshaft 16.

The rear wheel spindle 67, in addition to being shiftable vertically relative to the rear end of the implement frame 22, is also swingable about a vertical axis, and for controlling the lateral swinging of the spindle 67 and the wheel 21 mounted thereon, a steering arm 101 is fixed to the upper end of the spindle section 67, preferably as a part of the arm 66. The outer end of the arm 101 is apertured to pivotally receive the rear end of a fore and aft extending link means 102, which may be made adjustable in length, if desired, by turnbuckle means 103. The forward end of the link means 102 is connected by a swivel member 104 to the upper end of a fore and aft rockable arm 105, the lower end of which is mounted for rocking movement about the central portion of the rockshaft 41, which forms a part of the draft member 42. The upper end of the rockable arm 105 also carries a second swivel member 107 in which the rear end of a steering link means 108 is connected. The link means 108 includes an adjustable turnbuckle section 109 and at its forward end is pivoted to a swivel member 111 carried on the upper end of a turn bar 112 which is fixed, as at 113, to the left side of the drawbar support 7. The lengths of the upwardly extending part of the turn bar 112 and the rockable arm 105, and their positions, are such that the link 108 remains in substantially parallel relation with respect to the draft member 42 when the latter is swung about the axis of the cross shaft 41 relative to the implement frame when the latter is raised and lowered.

For the purpose of raising and lowering the implement by power, a bracket 121 is fixed to the frame bar 27 and is apertured to detachably receive a pin 122 which connects the front end of the ram unit 19 with the implement. The other end of the ram unit 19 is detachably connected by a pin 123 to arm means 124 which is connected with the rear cross shaft 59. Thus, extension or retraction of the ram unit 19 serves to rock the rear shaft 59 to raise and lower the rear end of the frame relative to the spindle 67 and, acting through the link 56, serves also to rock the draft member 42 about the axis of the rockshaft 41 and thereby raise and lower the front end of the implement relative to the tractor. During the rocking movement of the draft member 42, the link 108 remains substantially in parallelism with the draft member 42 whereby raising or lowering the frame does not cause any substantial fore and aft movement of the steering link 102.

As best shown in Figure 1, the turn bar 112 is disposed in a lateral position with respect to the vertical axis, at 52, about which the implement swings relative to the tractor drawbar 8. Therefore, turning of the tractor relative to the implement serves to shift the links 108 and 102 in a generally fore and aft direction, whereby they act through the arm 101 to steer the rear wheel 21. The steering link 102 is made adjustable by the turnbuckle means 103 so as to change the position of the wheel 21 relative to the line of travel in operation, whereby more or less lead, as desired, may be imparted to the rear furrow wheel 21. Moreover, when the implement is transported around sharp corners, as at the end of the field, or under other conditions, turning of the tractor relative to the implement will act through the links 108 and 102 to steer the wheel 21.

While the turn bar 112 and associated parts furnish a very convenient and easy to operate way of steering the rear wheel 21 in response to movement of the tractor relative to the implement, there may be some conditions in which it is not necessary at all times to transmit steering movement to the rear wheel. Accordingly, we have shown in Figure 3, a modified form of the present invention in which the stabilizing bail 80, described above, is replaced by a different form of stabilizing bail and the vertically swingable draft member 42 is replaced by one of slightly different construction. Referring now to Figure 3, a draft member 142 is connected to swing on the brackets 34 and 37 and comprises a cross shaft 143 rockably disposed in the plow frame bearing brackets 34 and 37 and forwardly and downwardly extending bars 144 and 145 secured at their rear ends, as by welding, to the cross shaft 143. Secured at their rear ends to the intermediate portions of the bars 144 and 145 are two forwardly converging bars 146 and 147. The forward ends of the several bars 144—147 are apertured to receive a forward crossbar 148 which preferably is rigidly secured, as by welding, to the bars 144—147 and the ends of the crossbar 148 extend laterally outwardly beyond the outermost bars 144 and 145 of the draft member 142 to receive stabilizing or leveling means to which reference will be made later. A narrow hitch member 151 is disposed about the central portion of the crossbar 148, between the forward ends of the draft frame bars 146 and 147, and is pivotally connected, as by a hitch pin 52a or the like, to the rear end of the tractor drawbar 8 for lateral swinging relative to the drawbar 8. The hitch member 151 pivots on the crossbar 148 and, in addition, the connection afforded by the hitch member 151 is sufficiently loose to allow a certain amount of lateral tilting of the draft frame or member 42 relative to the tractor about a generally longitudinal axis. Hence, the draft member 142 is capable of swinging both laterally and vertically relative to the tractor and also lateral tilting about a generally fore-and-aft extending axis. An arm 155 is connected rigidly to the left end of the transverse rockshaft 143 and is connected by a linkage 56a which may be substantially the same as the linkage 56 described above.

In this form of the invention the leveling or stabilizing mechanism includes a rigid bail 160, quite similar to the bail 80 described above. The bail 160 comprises a transverse bar 161 having forwardly extending arms 162 fixed to the ends of the bar 161, and each of the arms 162 extends forwardly and outwardly and at its forward end is turned laterally outwardly, as at 163, and pivotally connected with a clamp member 164 that is adapted to be fixed to the rockshaft 16 of the tractor. A pair of individually adjustable links 166 are connected between the outermost end portions of the drawbar cross member 148 and the end portions of the bail 160. Each of the links 166 comprises a lower sleeve section 167 having an eye 168 to receive the associated end of the crossbar 148. The upper portion of the sleeve section 167 is provided with a nut section 169 tapped to receive the threaded portion of an upper crank screw section 171 which is disposed in a transversely slotted outer section 172 of a swivel member 173 that is mounted on the outwardly extending end portion of the bail bar 161. An abutment 174 on the crank screw member 171 engages the upper portion of the associated attaching member 173 and a set screw collar 175 is mounted on each crank screw section 171 below the swivel attaching member 173. Thus, by turning one or the other of the crank screws 171, the front end of the implement may be tilted laterally relative to the tractor about a generally longitudinal axis, and the bail 160 being a rigid member thus holds the front end of the implement frame in position relative to the tractor so far as any lateral tilting is concerned. When the tractor turns relative to the plow, the links 166 are swung fore and aft, which is accommodated by limited swinging of the bail member 160 by virtue of the pivoting of the forward ends 163 of the arms 162 in the clamp members 164.

For steering the rear wheel of the plow, we provide in this form of the invention a steering link means 180, which is similar to the steering link means 102 described above, that at its rear end is connected to the rear wheel steering arm 101 and at its forward end includes a link 181 to which a pair of yoke straps 182 are connected. The yoke straps 182 form a forked portion which is pivotally connected with the upper end of a fore and aft rockable arm 185, the lower end of which is mounted for rocking movement about the central portion of the rockshaft 143, which forms a part of the draft member 142. The upper end of the rockable arm 185 is also forked so as to receive a swivel member 187 in which the rear end of a forward steering link 188 is connected. The forward end of the link 188 carries a pair of half socket members 189 which engage a ball 190 formed on the lower end of a depending arm 191. The latter is fixed to a short shaft 192 journaled in a sleeve 193 that is rigidly fixed, as by welding, to the bar 161, generally in a central position, and the position of the arm 191 is controlled by a hand lever 195 swingable laterally adjacent the operator's seat on the tractor and adapted to be locked in different positions of adjustment by detent mechanism 196 engaging a notched sector 197 that is rigidly fixed to the sleeve 193. The lengths of the rockable arm 185 and the depending arm 191, and their positions, are such that the link 188 remains in substantially parallel relation with respect to the draft member 142 when the latter is swung about the axis of the cross shaft 143 relative to the implement frame when the latter is raised and lowered. During the rocking movement of the draft member 142, the link 188 remains substantially in parallelism with the draft member 142 whereby raising or lowering the frame does not cause any fore and aft movement of the steering link 102.

In order to steer the rear wheel of the plow by the turning of the tractor relative to the implement, the hand lever 195 is operated so as to swing the ball 190 to a lateral position with respect to the vertical axis about which the implement swings relative to the tractor drawbar 8. When the ball 190 is disposed in the laterally offset position, turning of the tractor relative to the implement serves to shift the links 188 and 181 in a generally fore and aft direction, whereby they act through the arm 101 (Figure 1) to steer the rear wheel 21. Preferably, the hand lever 195 is kept in a position in which the ball 110 is centered substantially in line with the vertical axis about which the implement swings laterally relative to the tractor drawbar so that turning of the tractor relative to the implement will occasion no steering of the rear wheel 21. Instead, the hand lever and associated linkages serve to hold the rear wheel 21 in a position against lateral swinging. However, if it should become desirable to have the wheel 21 steer with turning of the tractor relative to the implement, as at the ends of the field or under other conditions where rear steering is desired, the hand lever 195 may be manipulated to shift the ball 190 to a laterally offset position, whereby turning of the tractor will then act through the links 188 and 181 to steer the wheel 21.

While the hand lever 195 and associated parts furnish a very convenient and easy to operate way of either holding the rear wheel 21 against steering in response to movement of the tractor relative to the implement or to provide for steering action when desired or necessary, there may be some conditions in which it is desirable to provide for a steering action at all times. Accordingly, we have shown in Figure 4 a further modified form of the present invention in which the stabilizing bail 160, described above, is replaced by a different form of stabilizing bail which includes a rear crossbar 221 which is square in cross section for the major portion of its length and is rounded only at its ends, as at 222, to receive the associated stabilizing link swivels 173. Arms 224 are fixed to the bail bar 221, substantially at the junctures of the rounded and squared portions, and the arms 224 are connected to the tractor power lift shaft by the same means described above in connection with the bail 160.

In both forms of the invention shown in Figures 3 and 4, each of the leveling or stabilizing link swivels 173 is formed with a flanged portion 226 (Figure 5) which includes an interior annular groove 227 which receives the end of a pin 228 that is inserted in an opening in the associated end of the rear stabilizing bail crossbar. The flanged portion 226 of each of the swivel members 173 has a cut-out portion 229 which is so arranged that the parts may be assembled by turning the swivel 180 degrees out of its normal position so as to cause the cut-out portion 229 to clear the outer end of the pin 228, thereby permitting the passage of the swivel 173 into position over the associated pin 228.

Figure 2:
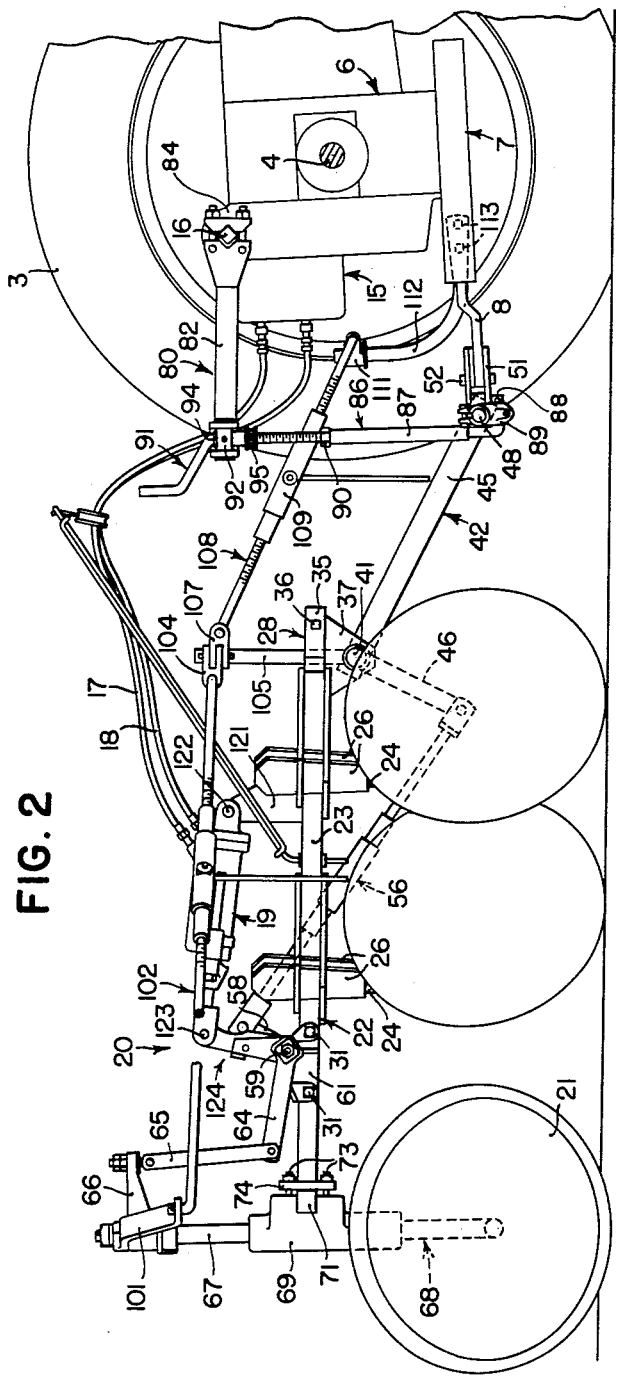

In the modified form of the invention shown in Figure 4, the hand lever 195 and associated parts is replaced by a depending arm 231 which at its upper end is formed with or carries a clamping head 232 with which a clamping cap 233 cooperates. The clamping head and cap are shaped to fit snugly over the squared portion of the bar 221 and clamping bolts 134 serve to firmly fix the steering arm 231 to the bar 221. The lower end of the arm 231 is threaded, as at 236, and receives an elongated sleeve member 237 which at its lower end is secured, as by welding, to a yoke member 238, the central portion of which is threaded, as at 239, and receives the lower portion of the arm 231. The side portions of the yoke 238 carry pivots 240 by which a pair of attaching parts 241 are bolted to the forward end of the link 188 in place of the ball socket members 189 described above. The vertical position of the yoke 238 on the arm 231 may be varied by releasing the connection between the yoke 238 and the link 188, turning the sleeve member 237 to shift the same either upwardly or downwardly, as desired, on the threaded portion of the arm 131, and then reconnecting the parts 241 to the yoke 238. Since the link member 188 is pivoted to the sleeve member 237 by means providing for pivotal movement about a transverse axis, and since the sleeve member itself may turn on the lower threaded end of the arm 231 about a generally vertical axis of the latter, it will be seen that the steering link 188 is connected by a universal joint means with the arm 231. The length of the latter and the arrangement of the associated parts are such that in this form of the invention the link member 188 is maintained substantially in parallelism with respect to the draft member 142 substantially as described above in connection with Figures 1 and 2.

Another modified form of the present invention is shown in Figures 6 and 7. This form of the invention is particularly adapted for use with tractors which do not have conveniently available any rockshaft, such as the rockshaft 16, Figures 1 and 2, with which leveling mechanism of the type shown in Figures 1–5 may be connected.

Referring now to the form of the invention shown in Figures 6 and 7, the disk plow, indicated in its entirety by the reference numeral 250, may be substantially like that described above except that the hitch or draft member 251 includes a pair of forwardly converging, generally forwardly and downwardly extending bars 252 and 253 which are rigidly fixed, as by welding, to a transverse shaft 254 rockably mounted in brackets 255 fixed to the frame of the implement 250. The left end of the transverse shaft 254 extends downwardly, as at 256, and is connected with linkages substantially like that shown at 56 in Figures 1 and 2 and operated by means such as a power unit 19 (Figures 1 and 2) in substantially the same way and for substantially the same purposes as described above in connection with the form of the invention first described. Fixed to the right-hand draft bar 253 is a forwardly and laterally outwardly extending auxiliary bar 258 which at its rear end is welded to the rear end of the bar 253 and which at its forward end is apertured to receive a laterally outwardly extending bar 259, the inner end of which is extended through apertures in the forward ends of the draft bars 252 and 253 and which serves to connect the implement 250 to the drawbar 260 of the tractor 261. The latter includes a drawbar support 262 fixed to the rear axle structure 263 of the tractor. The latter also includes laterally outwardly extending quills 264 and 265, each having attaching pads 266. Secured to the pads 266 of the right-hand rear axle section 265 is a rearwardly and upwardly extending bracket 271 which at its upper end carries a pair of hammer straps 272 that are apertured to receive a gimbal member 274 in which a sleeve 275 is trunnioned. A crank screw adjusting member 277 includes a crank handle 278 that is mounted for rotation in the sleeve member 275 and at its lower end is threaded into a sleeve section 279 which at its lower end is pivoted, as at 281, to a bracket 282 that is rockably mounted on the right or outer end of the leveling bar 259. By turning the crank handle 278 in one direction or the other, the effective length of the adjusting member 277 may be varied as desired and thereby acts through the auxiliary hitch member 258 to tilt the plow frame in one direction or the other.

Steering of the rear furrow wheel of the plow 250 is accomplished by the same means described above in connection with the form of the invention shown in Figures 1 et al, namely, by a part 291 swingably mounted on the central portion of the transverse shaft 254 and supporting linkages including an adjustable linkage 292 which at its front end is universally connected to the upper end of a turn bar 294 fixed, as at 295, to one side of the tractor, for example, to the left bar of the drawbar support 262.

While we have shown and described above, the preferred structure in which the principles of the present invention have been incorporated, it is to be understood that our invention is not to be limited to the particular details shown and described above, but that, in fact, widely different means may be employed in the broader aspects of our invention.

What we claim, therefore, and desire to secure by Letters Patent is:

1. An agricultural implement adapted to be connected to a tractor, comprising a frame, a steerable rear wheel therefor, a draft member connected for lateral and vertical swinging with the tractor and with said frame for vertical swinging relative to the latter, a part adapted to be mounted on the tractor above said draft member laterally of the axis of lateral swinging of the draft member relative to the tractor, a shiftable part mounted for rocking movement on the forward portion of the frame about an axis coincidental with the axis of swinging of the draft member relative to said frame, means connecting said shiftable part with the rear wheel to steer the latter, and a link connecting said shiftable part with said first mentioned part for causing lateral movement of the tractor relative to the frame to steer said rear wheel, said link extending substantially parallel with respect to said draft member.

2. An agricultural implement adapted to be connected to a tractor having a drawbar and a drawbar support, comprising a frame, a steerable rear wheel therefor, a draft member connected for lateral and vertical swinging with the drawbar and with said frame for vertical swinging relative to the latter, a part adapted to be fixedly connected with the tractor drawbar support laterally of the axis of lateral swinging of the draft member relative to the drawbar, a shiftable part mounted for rocking movement on the forward portion of the frame about an axis coincidental with the axis of swinging of the draft member relative to said frame, means connecting said shiftable part with the rear wheel to steer the latter, and a link connecting said shiftable part with said first mentioned part for causing lateral movement of the tractor relative to the frame to steer said rear wheel, said link extending substantially parallel with respect to said draft member.

3. The invention set forth in claim 2, further characterized by a part adapted to be fixed to the tractor and connected adjustably with the front portion of said draft member for holding the frame against movement about a fore and aft extending axis relative to the tractor.

4. An agricultural implement as defined in claim 1, further characterized by said first part being laterally shiftable toward and away from the axis of lateral swinging of the draft member relative to the drawbar.

5. An agricultural implement adapted to be connected with a tractor, said implement comprising a frame means, support means for the rear end of said frame in the form of a wheel and wheel axle connected with the frame for vertical shifting movement and steering movement about a generally vertical axis, a draft member pivotally connected to the front end of said frame and adapted to be pivotally connected with the tractor, means acting against said draft member and said wheel axle for raising and lowering said frame relative thereto, and means for steering said rear wheel by movement of the tractor relative to the implement comprising a part carried by said frame and connected to swing said wheel axle, a part adapted to be carried by the tractor, and a link pivotally connected at its ends, respectively, with said parts, said parts being positioned so that said link lies substantially in parallelism with said draft member whereby changes in the position of the latter incident to raising and lowering of the frame do not affect the steering position of said rear wheel.

6. The invention set forth in claim 1, further characterized by means to mount said first mentioned part on the tractor, comprising a generally rearwardly extending tranversely disposed stabilizing bail and means shiftably supporting said part on said bail, and means including a pair of laterally spaced generally vertically extending, individually adjustable links connecting the forward portion of said draft member to opposite ends of said stabilizing bail.

7. The invention set forth in claim 1, further characterized by said first mentioned part having generally lateral movement relative to the tractor into and out of a position in alignment with the generally vertical axis of lateral swinging of the draft member relative to the tractor, disposition of the tractor-mounted part in said axis serving to hold said rear wheel against steering movement when the implement swings laterally relative to the tractor and movement of said tractor mounted part laterally outwardly of said axis serving to cause said tractor mounted part to impart steering movement to said rear wheel when the implement swings laterally relative to the tractor.

8. The invention set forth in claim 1, further characterized by means adapted to be carried on the tractor and accessible from the operator's station for shifting said first mentioned part into a position in alignment with the axis of lateral swinging of the frame relative to the tractor.

9. An agricultural implement adapted to be connected to a tractor, comprising a frame, a steerable rear wheel therefor, a draft member connected for lateral and vertical swinging with the tractor and with said frame for vertical swinging relative to the latter, a part adapted to be mounted on the tractor and including a portion disposed above said draft member laterally of the axis of lateral swinging of the draft member relative to the drawbar, a shiftable part mounted for rocking movement on the forward portion of the frame about an axis coincidental with the axis of swinging of the draft member relative to said frame, means connecting said shiftable part with the rear wheel to steer the latter, and a link connecting said shiftable part with said first mentioned part for causing lateral movement of the tractor relative to the frame to steer said rear wheel, said link extending substantially parallel with respect to said draft member.

10. An agricultural implement adapted to be connected to a tractor, comprising a frame, a steerable rear wheel therefor, a draft member connected with the tractor for lateral and vertical swinging relative thereto and with said frame for vertical swinging relative to the latter, a part adapted to be mounted on the tractor generally at one side of said draft member, a shiftable part mounted for rocking movement on the forward portion of the frame about an axis coincidental with the axis of swinging of the draft member relative to said frame, means connecting said shiftable part with the rear wheel to steer the latter, means including a link disposed generally parallel to said draft member for connecting said shiftable part with said first mentioned part for causing lateral movement of the tractor relative to the frame to steer said rear wheel, a leveling bar connected at one end to the draft member and extending laterally outwardly therefrom, a bracket fixed to the tractor generally at the other side of the draft member, and leveling means connecting the outer end of said leveling bar with said bracket.

11. An agricultural implement adapted to be connected to a tractor, comprising a frame, a steerable rear wheel therefor, a draft member connected with the tractor for lateral and vertical swinging and with said frame for vertical swinging relative to the latter, a part adapted to be mounted on the tractor generally at one side of the vertical axis of lateral swinging of said draft member relative to the tractor, a shiftable part mounted for rocking movement on the forward portion of the frame about an axis coincidental with the axis of swinging of the draft member relative to said frame, means connecting said shiftable part with the rear wheel to steer the latter, means including a link disposed generally parallel to said draft member for connecting said shiftable part with said first mentioned part for causing lateral movement of the tractor relative to the frame to steer said rear wheel, a leveling bar connected at one end to the draft member, a bracket fixed to the tractor adjacent one side thereof, and leveling means connecting an outer portion of said leveling bar with said bracket.

12. An agricultural implement as defined in claim 5, further characterized by said second part comprising a member adapted to be supported in transverse position on the tractor and a steering part carried by said transverse member and shiftable generally laterally toward and away from said generally vertical axis, and a pair of adjustable links depending from the end portions of said transverse member and connected at their lower ends to opposite sides of the front portion of said draft member.

13. The invention set forth in claim 9, further characterized by means adapted to be mounted on the tractor and accessible from the operator's station for shifting said first mentioned part toward and away from the axis of lateral swinging of the draft member relative to the drawbar.

14. The invention set forth in claim 1, further characterized by a member adapted to be supported in transverse position on the tractor, and means connecting said first mentioned part to said transverse member for shifting movement laterally toward and away from the axis of lateral swinging of said draft member, so as to vary the degree of steering movement transmitted to said steerable rear wheel.

15. The invention set forth in claim 14, further characterized by a pair of adjustable links depending from the end portions of said transverse member and connected at their lower ends to opposite sides of the front portion of said draft member for leveling the latter and said implement frame.

16. The invention set forth in claim 1, further characterized by a transverse member adapted to be mounted on a tractor, and means adjustably fixing said first mentioned part to said member in different positions relative to the axis of lateral swinging of said draft member with respect to the tractor.

17. The invention set forth in claim 16, further characterized by said last mentioned means including a hand lever pivoted on said transverse member and carrying said first mentioned part, and means fixing said hand lever to said transverse member in different positions of adjustment.

18. The invention set forth in claim 1, further characterized by a rigid bail-like member adapted to be carried by the tractor and including a transverse section to which said first mentioned part is fixed.

19. The invention set forth in claim 18, further characterized by a leveling link connected at its upper end with an end portion of said transverse bail section, and means connecting the lower end of said leveling link with one side of the draft member.

20. The invention set forth in claim 1, further characterized by a laterally extending bar connected with the forward portion of said implement frame, and means acting between the laterally outer end of said bar and the tractor for leveling said frame.

21. The invention set forth in claim 20, further characterized by said leveling means including a bracket attachable to one side of the tractor generally in the vertical fore-and-aft extending plane passing through the laterally outer end of said bar, and an adjustable connection between the outer end of said bracket and the outer end of said bar.

References Cited in the file of this patent

UNITED STATES PATENTS

| Number | Name | Date |
|---|---|---|
| 1,422,186 | Davis | July 11, 1922 |
| 1,831,997 | Brown | Nov. 17, 1931 |
| 2,065,015 | Nielsen | Dec. 22, 1936 |
| 2,098,472 | Strandlund | Nov. 9, 1937 |
| 2,159,669 | Morkoski | May 23, 1939 |
| 2,217,900 | Graham | Oct. 15, 1940 |
| 2,223,002 | Ferguson | Nov. 26, 1940 |
| 2,271,533 | Altgelt | Feb. 3, 1942 |
| 2,320,141 | Kott | May 25, 1943 |
| 2,322,342 | Bunn | June 22, 1943 |
| 2,324,870 | Orelind | July 20, 1943 |
| 2,354,274 | Orelind | July 25, 1944 |
| 2,386,378 | Wippel | Oct. 9, 1945 |
| 2,561,644 | Averette | July 24, 1951 |
| 2,608,145 | Knapp | Aug. 26, 1952 |